L. E. Hicks,
Hose Coupling.
Nº 12,937.          Patented May 22, 1855.
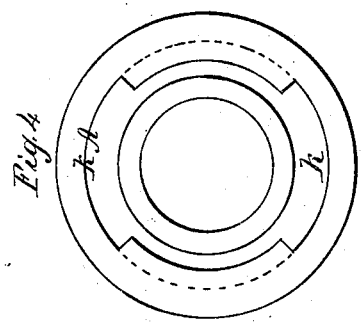
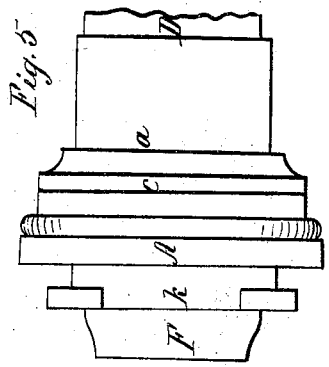
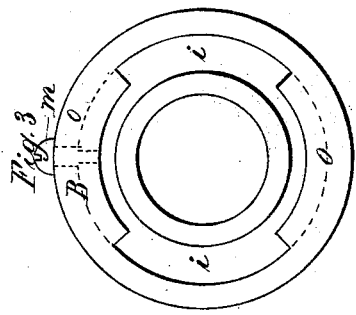
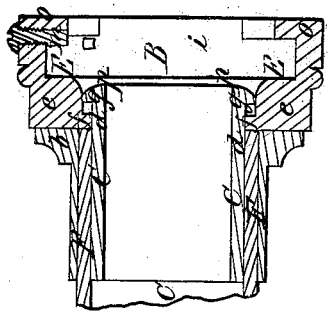
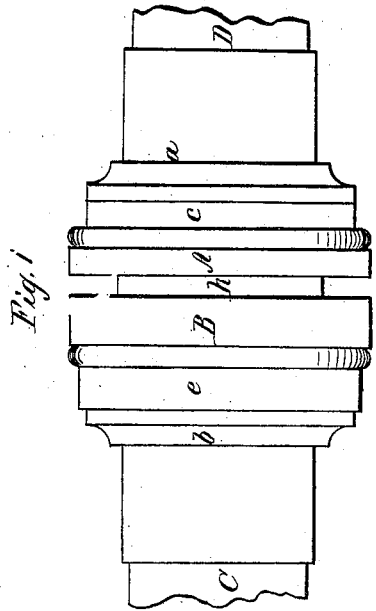
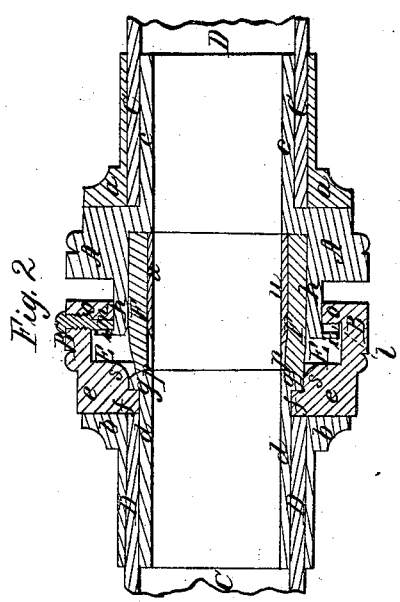

UNITED STATES PATENT OFFICE.

L. E. HICKS, OF BOSTON, MASSACHUSETTS, ASSIGNOR TO HIMSELF AND GEO. N. DAVIS.

HOSE-COUPLING.

Specification of Letters Patent No. 12,937, dated May 22, 1855.

*To all whom it may concern:*

Be it known that I, LUCIEN E. HICKS, of Boston, in the county of Suffolk and State of Massachusetts, have invented a new and useful Improvement in Hose-Couplings; and I do hereby declare that the same is fully described and represented in the following specification and the accompanying drawings, letters, figures, and references thereof.

Of the said drawings Figure 1, denotes an external view of one of my improved hose couplings; Fig. 2, is a longitudinal section of the same; Figs. 3, and 4, are inner end views of the male and female portions of the coupling; Fig. 5, is an external view of the male portion the same exhibiting its catch recess; Fig. 6, is a longitudinal section of the female and represents the locking catch and the catch stop y, thereof.

In the said figures, A, and, B, denote what I term the male and female portions of the coupling, the part, B, being made to receive and lock upon the part, A, as will be hereinafter described.

C, and, D, exhibit two portions of tubular hose affixed to the parts, A, and B, by means of collars, a, and, b, and tubular projections, c, d, connected by rivets as in ordinary hose couplings.

In order that the hose may be rotated transversely, I make the part, c, of the portion B, to turn freely and transversely on the tubular part, d, each part, d, and, e, being provided with a circular shoulder flanch as seen at f, and, g, in Fig. 2.

The portion or half, B, of the coupling is formed with a cylindrical chamber, E, which is made to receive a tubular extension, h, of the part, A. The said chamber, E, and the said part, h, are provided with locking projections and corresponding recesses, as seen at, i, i, o, o, and, k, k, (see Figs. 3, and 4,) the same constituting with a recess or notch, l, formed in the inner side of one of the projections, i, i, and a stud or projection, m, extended from one of the two parts or projections, o, o, what is usually a "bayonet connection." The common "bayonet catch" is a method of connecting two tubes well known and understood. I apply essentially such a device or method of connection to the two coupling parts, A, and, B, and I extend from one of them toward and into the other an elastic tube (composed of vulcanized india rubber or other suitable material) which I cause to bear at one end against the front or inner end of the tube, d, as seen in Fig. 2, and I chamfer off or make conical the said end of the said tube, d, as seen at, r, in order that when the tube, F, is compressed longitudinally its expansion power acting against the conical part, r, may force said tube against an inclosing seat, s, formed within the part, e.

In connecting the two parts, A, and, B, of the coupling they are to be brought together, so that the projections, i, i, of the one may be made to enter the recesses, k, k, of the other, and so as to bring the inner end of the tube, F, in contact with its seat, r. Next, the parts, A, and, B, should be pressed firmly together so as to contract the tube F to an extent sufficient to introduce the parts, i, i, so far into the chamber F, as to carry them beyond its projections, o, o. Then by turning the part, A, a short distance, the locking catch, m, of one of the parts, o, will be brought opposite to its recess or notch, t, and will be pressed into the same by the expansive power, of the tube, F, the said tube, F, being supposed to have an increased expansive force sufficient to form a close joint with the part, r, or with such part and the inclosing seat s, under pressure of water or liquid within the hose, as the hose is capable of enduring.

From the inner end of the part, A, and concentric with the part, h, a short projection or tube u may be extended as seen in Fig. 2, the same being to support the elastic tube F, or prevent it from collapsing when the hose is used as a suction hose or a fluid is drawn through it, in this case the tube F, would embrace the shoulder tube, u, or extend entirely around it.

The common method of using male and female screws and leather washers for the joints of the hose is attended with a considerable loss of time in connecting and disconnecting the couplings. Besides this the pressure of the male screws against the annular washer is so great as to often render it exceedingly difficult if not impossible to rotate the hose transversely with respect to the coupling as it is often desirable to do in order to remove twists from it or for other purposes.

With my improved coupling the attachment or detachment of two pieces or sections of hose, can be effected in a very short period of time in comparison with what is consumed when the common screw coupling is employed.

I do not claim a common annulus of leather as a packing for the screw joint of a hose coupling, but What I do claim is—

1. Combining the two parts or halves, A, B, of the coupling by means of a locking or bayonet connection or the equivalent therefor, and an elastic tube, F, possessing sufficient elasticity not only to form by its expansive power when compressed, a close joint under pressure of a liquid within the hose as explained but to maintain the locking connections in place, when the catch stud is in its recess as described.

2. I also claim making the bearing shoulder, r, conical or so as to cause the circumference of the tube, F, to be borne against the cylinder seat, s, by the expansive power of the tube acting against such conical part as described the same being not only to give support to the tube, F, but to aid in maintaining a close joint against the pressure of the fluid in such tube as explained.

3. I also claim the shoulder tube u, as combined with the elastic packing tube F, and the part A, and used substantially in manner and for the purpose of supporting the tube F, as specified.

In testimony whereof, I have hereunto set my signature this twenty-fifth day of January A. D. 1855.

L. E. HICKS.

Witnesses:
R. H. EDDY,
F. P. HALE, Jr.